Dec. 10, 1940.     O. KAUFMANN     2,224,602
ELECTRIC VALVE CONTROL CIRCUIT
Filed March 28, 1939
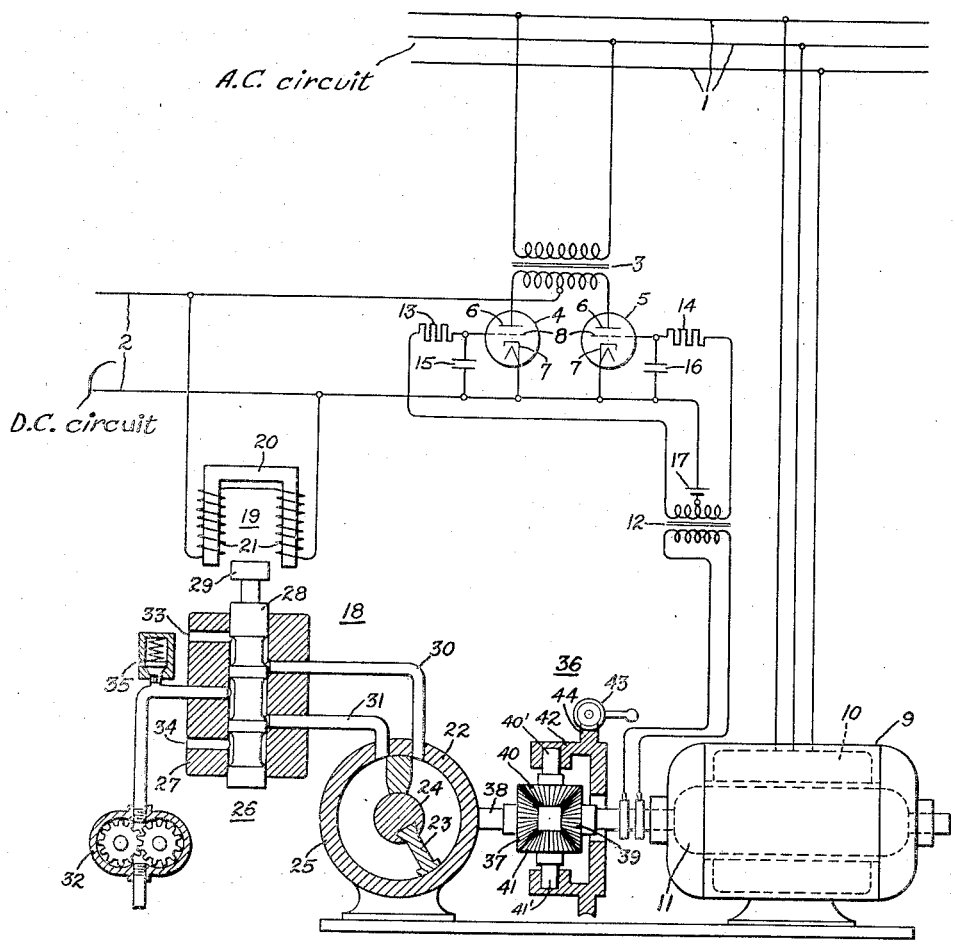
Inventor:
Otto Kaufmann,
by Harry E. Dunham
His Attorney.

Patented Dec. 10, 1940

2,224,602

UNITED STATES PATENT OFFICE 2,224,602

ELECTRIC VALVE CONTROL CIRCUIT

Otto Kaufmann, Berlin-Steglitz, Germany, assignor to General Electric Company, a corporation of New York Application March 28, 1939, Serial No. 264,671
In Germany July 19, 1938

1 Claim. (Cl. 250—27)

My invention relates to electric valve translating circuits and more particularly to control circuits for electric valve apparatus.

In the control of electric valve apparatus of the type employing a control member for controlling the conductivity thereof, it is frequently desirable to impress on the control member a voltage of adjustable or controllable phase position with respect to the voltage of an associated alternating current circuit. More specifically, it has been found desirable in many applications, in order to obtain flexibility of control and precision of operation, to impress on the control member a periodic or alternating voltage which is adjustable and controllable in phase with respect to the anode-cathode voltage of the electric valve means, or the voltage of an associated alternating current circuit. In accordance with the teaching of my invention described hereinafter, I provide a new and improved control or excitation system for electric valve translating apparatus in which the control voltage is controlled automatically in response to a predetermined controlling influence, and in which the control voltage may be readily adjusted by manual means without necessitating a disconnection or interruption of the automatic control means.

It is an object of my invention to provide a new and improved electric valve translating circuit.

It is another object of my invention to provide a new and improved control or excitation circuit for electric valve means of the controlled type.

It is a further object of my invention to provide a new and improved control system for energizing the control member of electric valve means, whereby the control voltage is automatically controlled and whereby the voltage may be manually adjusted without disconnection of the associated automatic control means.

In accordance with the illustrated embodiment of my invention described hereinafter, I provide a new and improved control system for electric valve translating apparatus comprising electric valve means of the type having a control member for controlling the conductivity thereof. A control voltage is impressed on the control member of the electric valve means and may be adjusted in phase position with respect to the voltage of an associated alternating current circuit. For example, a control voltage may be supplied by a rotary phase shifting device having a stator or stationary member and having a rotatable member the phase position of which controls the phase of the voltage impressed on the control member with respect to the anode-cathode voltage of the electric valve means, or with respect to the voltage of the associated alternating current circuit. A suitable automatic electrical or mechanical system, such as a fluid pressure system, produces a rotary motion which varies in accordance with a predetermined controlling influence, such as the voltage, current, or power factor of an associated circuit. Interposed between the fluid pressure system and the rotatable member of the phase shifting device, I provide a differential gear mechanism which permits manual as well as automatic control of the phase of the voltage impressed on the control member of the electric valve means.

For a better understanding of my invention, reference may be had to the following description taken in connection with the accompanying drawing, and its scope will be pointed out in the appended claim. The single figure of the accompanying drawing diagrammatically illustrates an embodiment of my invention as applied to an electric valve translating system in which a rotary phase shifter is controlled by a fluid pressure system, such as the Thoma system.

Referring now to the single figure of the accompanying drawing, my invention is there represented as applied to an electric valve translating system for transmitting power between an alternating current circuit 1 and a direct current circuit 2 and comprising a transformer 3 and electric valve means 4 and 5 which are preferably of the type employing an ionizable medium, such as a gas or a vapor. Each of the electric valve means 4 and 5 comprises an anode 6, a cathode 7 and a control member 8 which initiates the establishment of arc discharges between the associated anode and cathode.

In order to impress on the control members 8 suitable control voltages adjustable and controllable in phase position with respect to the voltage of the alternating current circuit 1 or with respect to the anode-cathode voltages of the electric valve means 4 and 5, I provide a suitable controlling means such as a rotary phase shifting device 9 having a stator or stationary member 10 and a rotatable member 11. It is to be understood that the stationary member 10 and the rotatable member 11 may be of the distributed winding type. It is to be further understood that I may employ other suitable phase shifting means, such as impedance phase shifting circuits having adjustable or movable contacts in order to control the phase of the resultant voltage impressed on the control members 8, and that I may also employ circuits such as contact making and breaking distributor mechanisms. The control voltage derived from the rotatable member 11 is impressed on the control members 8 through a transformer 12 and current limiting resistances 13 and 14. Capacitances 15 and 16 may be connected between the cathodes 7 and the control members 8 to absorb extraneous transient voltages which may be present in the control circuit. A suitable source of negative unidirectional biasing potential 17 is connected in circuit with the secondary winding of transformer 12 and the control members 8.

As a means for producing a rotary motion which varies in magnitude and direction in accordance with a predetermined controlling influence, such as the voltage of one of the associated circuits, I employ any suitable arrangement such as a fluid pressure system 18. The system 18 may comprise an electromagnet 19 having a core member 20 and an actuating coil 21 which may be connected to be responsive to an electrical condition of one of the associated circuits, such as the voltage of the direct current circuit 2. A servo-motor 22 produces a rotary motion which varies in accordance with the controlling influence and comprises a rotatable blade 23 which is supported on a shaft 24 and rotates within an enclosing housing 25. In order to control the direction of rotation and the angle of rotation of the blade 23, I employ a fluid pressure valve 26 comprising a casing 27 and a valve member 28. An armature 29, which is connected to the valve member 28, is actuated by the electromagnet 19 and selectively controls conduits 30 and 31. A suitable fluid under pressure for operating the system, such as oil or air, is supplied to the valve 26 by any suitable means such as a pump 32. The casing 27 is provided with exhaust ports 33 and 34. A relief valve 35 may be connected to the system, if desired.

In order to transmit the rotary motion produced by the system 18 to phase shifting device 9 and to permit adjustment of the voltage impressed on the control members 8 without necessitating the disconnection of the system 18, I provide an adjustable motion transmitting system such as a differential gear mechanism 36. The differential gear mechanism 36 comprises a bevel driving gear 37 which is connected to the shaft 24 through a shaft 38 and comprises a driven bevel gear 39. Interposed between the driving gear 37 and the driven gear 39, I employ a pair of intermediate bevel gears 40 and 41 having shafts 40' and 41' which are supported by a cylindrical shell or cap 42 which is rotatably mounted and may be adjustably controlled by any suitable means, such as a worm gear and thread arrangement 43. The worm thread may be placed on a projection 44 of the cap 42 to permit wide variation or range in adjustment.

The operation of the embodiment of my invention shown in the single figure of the drawing will be explained by considering the system when it is operating to transmit power from the alternating current circuit 1 to the direct current circuit 2 through the transformer 3 and the electric valve means 4 and 5. As is well understood by those skilled in the art, the average voltage impressed on the direct current circuit 2 is determined by the times during the cycles of applied anode-cathode voltages at which the electric valve means 4 and 5 are rendered conductive. The times at which the arc discharges within the electric valve means 4 and 5 are initiated is determined by the control voltages impressed on control members 8. The value of the voltage of the direct current circuit 2 increases as the phase of the control voltages is advanced to the point of substantial phase coincidence with the anode-cathode voltages and is, of course, decreased as the phase of these voltages is retarded with respect to that point.

The fluid pressure system 18 produces rotary movement of the shaft 38 in response to the voltage of circuit 2. The magnetization produced by the electromagnet 19 varies in accordance with the voltage of circuit 2 and, of course, controls the position of the valve member 28 by acting on the armature 29. Conduits 30 and 31 may operate either as inlet or exhaust conduits to control the direction and angle of rotation of blade 23, and hence control the direction and angle of rotation of shaft 38.

The rotary motion produced by the fluid pressure system 18 is transmitted to the differential gear mechanism 36 through the shaft 38 which drives the gear 37. Inasmuch as the adjustment of the driven gear 39 is substantially unimpeded, the driven gear 39 rotates in an opposite direction through a corresponding angle, and the shafts 40' and 41' of the intermediate gears 40 and 41 rotate within the cap 42 without rotating the cap. For example, the fluid pressure system 18 responds to variations in the voltage of circuit 2 to produce a rotary motion which is transmitted to the rotatable member 11 of the phase shifting device 9, thereby shifting the phase of the voltages impressed on control members 8 to compensate or correct for the changes in the voltage of the direct current circuit 2. If it is desired to effect adjustment of the phase of the voltages impressed on the control members 8 without necessitating disconnection of the fluid pressure system 18, the cap 42 may be rotated by means of the worm gear 43 to rotate the axis of the intermediate gears 40 and 41, thereby rotating the driven gear 39. Of course, the rotatable member 11 will be rotated through a corresponding angle, effecting a change in phase of the voltages impressed on control members 8. The embodiment of my invention diagrammatically illustrated affords ready adjustment of the control voltages and, as is also evident, offers a wide range of adjustment of the voltages impressed on the control members 8. The manual adjustment is thus effected without the use of special apparatus for disconnecting the automatic control means, and thus obviates the disadvantages incident to the requirement of additional apparatus. An important feature of the control system which I provide is that of permitting manual adjustment of the control voltages impressed on control members 8 contemporaneously with the operation of the automatic control means. This advantage is of decided importance in many industrial applications where it is desired to effect adjustment of an operating condition or an electrical condition of translating apparatus without disconnecting the automatic control means.

While I have shown and described my invention as applied to a particular system of connections and as embodying various devices diagrammatically shown, it will be obvious to those skilled in the art that changes and modifications may be made without departing from my invention, and I, therefore, aim in the appended claim to cover all such changes and modifications as fall within the true spirit and scope of my invention.

What I claim as new and desire to secure by Letters Patent of the United States is:

In combination, an electric valve means having an anode, a cathode and a control member, an excitation circuit comprising means for impressing on said control member a voltage to render said electric valve means conductive, said last mentioned means having a movable member to control said voltage, means comprising a fluid pressure system for producing rotary motion in accordance with a predetermined controlling influence, differential gear mechanism connected between said last mentioned means and said movable member for transmitting said motion, and means for adjusting said gear mechanism to adjust said voltage concurrently with the operation of said fluid pressure system.

OTTO KAUFMANN.